June 16, 1964   J. F. TAPLIN   3,137,215
ROLLING SEAL DIAPHRAGMS
Filed Oct. 26, 1962

United States Patent Office 3,137,215
Patented June 16, 1964

3,137,215
ROLLING SEAL DIAPHRAGMS
John F. Taplin, 15 Sewall St., West Newton, Mass.
Filed Oct. 26, 1962, Ser. No. 233,379
4 Claims. (Cl. 92—103)

This invention relates to rolling seal diaphragms. More particularly, it provides new and improved methods of making such diaphragms of improved characteristics, as well as such novel diaphragms.

Rolling seal diaphragms have been widely used for a number of years, and offer great advantages in achieving substantially frictionless sealing between relatively movable pistons and cylinders. They are the subject of United States Patent No. 2,849,026, "Flexible Fluid Sealing Diaphragm," granted to me on August 26, 1958. As disclosed therein, the head portion of a rolling seal diaphragm is secured to a piston, while the base portion is secured to a cylinder of larger diameter, the diaphragm rolling wall being convoluted in between in a half-torus defined by rotating about the axis of the diaphragm a semicircle of diameter corresponding to the convolution width and half the difference between cylinder and piston diameter. Convolution widths vary for example from $1/16"$ to $1/4"$.

It has been found that rolling seal diaphragms can be given improved flex life by giving to the fabric layer of the rolling wall thereof increased (but still limited) circumferential extensibility, particularly in angular zones around the rolling wall in which circumferential extensibility is less than in other angular zones, and which consequently are subject to greater strain in use. In my pending applications Serial No. 830,388, now Patent No. 3,083,734, entitled "Rolling Seal Diaphragm," filed July 29, 1959, and Serial No. 206,143, entitled "Method of Making Rolling Seal Diaphragm," filed June 27, 1962, I have disclosed a method of obtaining increased general circumferential extensibility and diaphragms of a particular form characterized by increased circumferential extensibility.

It is a primary object of the present invention to provide a rolling seal diaphragm with increased flex life, particularly with wide convolution use, and at the same time with great structural integrity across the head. It is a further main object to provide such a diaphragm in which the limited circumferential extensibility around the maximum strain periphery is at least 5% in any angular portion of 10° or more. It is a further primary object of the present invention to provide rolling seal diaphragms and fabric elements therefor characterized by increased circumferential extensibility around the maximum strain and other peripheries thereof. It is a further and important object to provide such diaphragms and elements in which the degree of additional or increased circumferential extensibility given is the same all the way around said peripheries. Yet another important object is to provide through such increased and uniform extensibility the entire amount of extensibility required, around said maximum strain periphery and elsewhere in the rolling wall portion of the diaphragm or element to stretch from the piston to the cylinder. It is a further object to accomplish the above to provide diaphragms in which the head portion of the diaphragm fabric element is defined by interlocking threads integral with and continuous with those of the wall portion, in which the head portion may be pierced by a hole less than half the head diameter or lacking altogether, and in which the head portion is not circumferentially compressed, all to provide improved strength and structural integrity.

The wall periphery (defined by intersection with the wall of a plane perpendicular to the wall and diaphragm axis) which is below the head a distance corresponding to half the circumference of a circle having the particular convolution diameter characterizing the diaphragm in use is the periphery subject to the greatest proportional stretch, such stretch being expressed as a percentage of the total circumferential extensibility around the periphery, in diaphragms made in accordance with the teachings of the above patent. That circumference must be able in use to stretch from a length corresponding to the circumference of the piston to a length corresponding to the circumference of the cylinder (wall thickness effects aside), and no greater stretch is required of any periphery further from the head. In diaphragms made according to the teachings of my Patent No. 2,849,026, the amount of circumferential compression and circumferential extensibility resulting therefrom (there is also some circumferential extensibility owing to relative movability of interlocking fibers, as bias and equivalent effects) increases continuously at peripheries increasingly far from the head. Accordingly, the stretch required in use relative to the stretch built in through circumferential compression is at a maximum along the periphery which extends around the rolling wall at a distance from the head corresponding to half the circumference of the use convolution width or diameter. Even at the said periphery a distance from the head corresponding to half the circumference of the use convolution diameter, however, the amount of stretch built in by the above method is always in excess of that required around the said periphery, which may be called the maximum strain periphery. Nevertheless, it has been found that when circumferential compression is achieved in this manner, which involves drawing fabric between flat platens and smooth male and female dies, the compression occurring does not, particularly near the head, take place evenly around the entire circumference. For example, when a layer of flat woven fabric is drawn between such dies, there is relatively greater circumferential compression in the zones of the peripheries corresponding to bias portions of the fabric, and less circumferential compression in the peripheries at which the threads or fibers were in the original fabric more nearly perpendicular; i.e., in the vicinity of fibers or threads in the fabric layer which in the finished diaphragm intersect and are coplanar with the axis of the diaphragm (hereinafter sometimes called axial threads $t_a$). One significant factor reducing the amount of circumferential compression in these non-bias zones of the maximum strain periphery of diaphragms made according to Patent No. 2,849,026, to 2% to 4% in angular portions as great as 10° around said periphery is that threads crossing ($t_c$) such axial threads centrally of the former and arched relative to the latter in the wall are in the dies subject to an axial force away from the peak of the arch at each of their ends, tending to counteract compression centrally of them. Even more significant perhaps is that compression is easier on the bias than off it. In flat knitted fabrics, the courses are in particular subject to similar distorting forces. In both types of fabrics, formed of interlocking threads or fibers limiting extensibility, the various threads in various portions of the wall formed according to the above patent have varying relations to one another, resulting in varying amounts of circumferential compression around a particular wall periphery, and various angular zones in which limited circumferential extensibility is less than in others.

In some instances, it appears that in some such angular zones the amount of circumferential extensibility is, for short distances at least, less than enough, along the maximum strain periphery, to permit the required stretch in that zone, without borrowing from an adjacent zone. This accentuates a circumferential movement in the diaphragm causing a scrubbing effect at the convolution which tends to cause wear. Some tendency for such circumferential movement exists whenever the degree of extensibility differs at different angular portions of the same periphery of the rolling wall, but it is most serious when the extensibility of the least extensible zone is less than that required to provide for the requisite convolution thereat.

Generally speaking, the present invention in its method aspect features forming a fabric wall of interlocking threads cooperating to give no more than limited circumferential extensibility and freedom from axial ("axial" being defined as having a component parallel to the axis of the wall) extensibility, for example according to the method heretofore mentioned, pressing at least portions of the wall between dies of variable diameter and decreasing the circumferences of the male die peripheries and correspondingly decreasing the circumferences of the female die peripheries to produce further circumferential compression in the wall, and setting the wall with that compression therein. A layer of elastomer is then formed on the fabric layer, to complete the diaphragm.

Other objects, features, and advantages will appear from the following description of a preferred embodiment of the invention, taken together with the attached drawings illustrating said preferred embodiment, in which.

Figure 1:
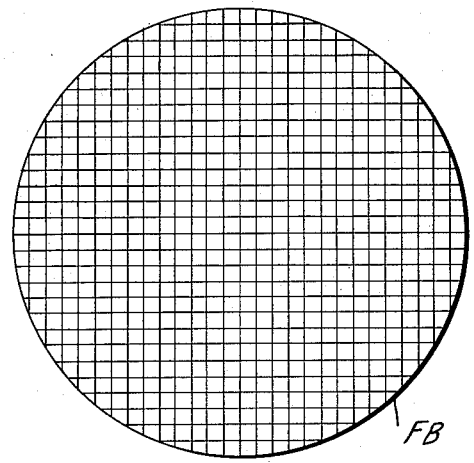
FIG. 1 is a plan view of a blank of woven or loomed fabric.
Figure 2:
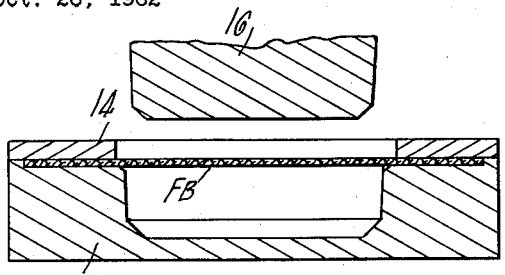
FIG. 2 is a diagrammatic side view, in section, showing said blank ready for drawing between the male and female die.
Figure 3:
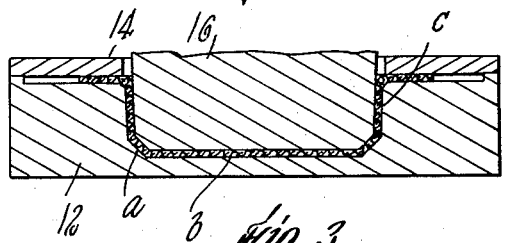
FIG. 3 is a corresponding view showing said blank drawn therebetween to form an element.
Figure 4:
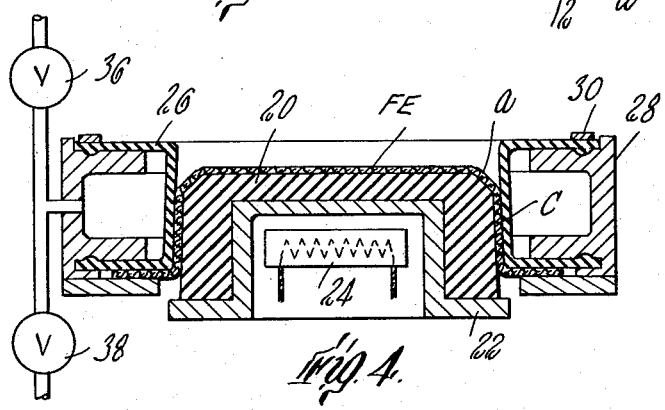
FIG. 4 is a diagrammatic side view, in section, of said element after being removed from the dies of FIGS. 2 and 3 and mounted between a pair of circumferentially variable dies.
Figure 1A:
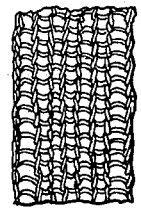
FIG. 1a is a corresponding, broken away and diagrammatic view of a blank of flat knitted fabric.
Figure 5:
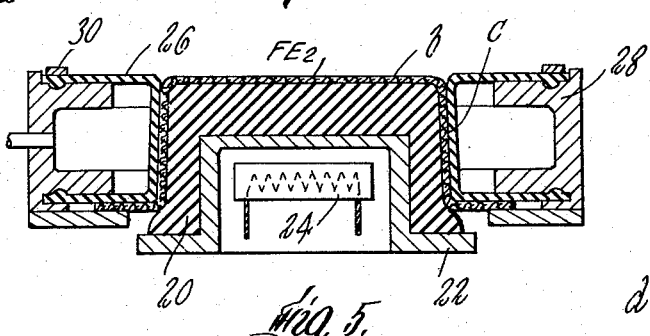
FIG. 5 is a view corresponding to FIG. 4 in which said element has been further circumferentially compressed.

Referring now more particularly to the drawings, there is shown in FIG. 1 a blank of woven fabric FB. The blank of fabric FB is laid on the smooth counterbore surface of female die 12, and a slip ring 14 with smooth lower surface is then urged thereagainst. Male die 16 is then moved against the fabric FB and on to draw the latter through the slip ring (with a minimum of friction thereagainst) and down into the female die 12, to the configuration shown in FIG. 3. The fabric element FE is then set in that configuration; it may suitably be, for example, Nylon, Orlon, or Dacron, in which case it is heat settable thereto. After being set, the fabric element is removed from the dies 12 and 14. If desired, several fabric elements FE may be drawn simultaneously in the manner just described, the clearance between the slip ring and counterbore and between the male and female dies being adjusted in each case to provide insufficient clearance to permit any folding upon itself (to produce three thicknesses) of any particular blank or element. The matters set forth in this paragraph are according to the method disclosed in my patent above mentioned, and result in a fabric element FE (or if united with a layer of elastomer a diaphragm) of the character already above discussed. It includes a fabric wall $ac$ with an outer surface defined by rotating about the axis of the element a rectilinear line with an upper portion $a$ at an angle to the lower portion $c$ and at a 45° angle to the element axis. The inner surface of the wall $ac$ is concentric with the outer. The diameter of the head portion $b$, corresponding to the upper diameter of the portion $a$, is in the preferred embodiment that desired in the final fabric element $FE_2$, and corresponds to the diameter (aside from elastomer thickness if the latter is placed inside the fabric element) of the piston with which the finished diaphragm is to be used. The lower and larger diameter of the portion $a$ corresponds similarly to the diameter of the cylinder in which the finished diaphragm is to be used.

The set element FE is then mounted on the male die 20, which is formed of closed cell polyurethane, its external configuration corresponding to the internal configuration of the element FE, and mounted on support 22, in which is mounted an electrical heater indicated digrammatically at 24, which heats the foam die 20. Seated around the element FE then is female die 26, which is of heat-resistant silicone rubber formed in a ring of channel cross-section, and airtightly secured on housing 28 by rings 30, and slip ring 32. The housing 28, which is open toward the surface of the channel opposite the die surface of die 26, is in communication through valves 36 and 38 with vacuum and pressure respectively, the former facilitating withdrawal of the female die from the finished fabric element $FE_2$. Pressure is introduced through the valve 38 to first bring the female die 26 into contact with the entire outer surface of the wall portion $c$, so that the wall portion $c$ is clasped between the male and female dies.

Pressure inside the housing 28 is then increased continuously to expand the female die continuously more, correspondingly decreasing its various die peripheries. The female die 26 as it thus expands acts through the fabric element FE to correspondingly compress the male foam die 20, decreasing its various periphery diameters by the same amount as are being decreased opposed periphery diameters of the female die 26. This is continued until the diameter of the female die 26 corresponds to the diameter of the head $b$. As the diameter of the male die is decreased, its thickness above the support 22 is increased, urging the head $b$ upwardly and putting the wall $ac$ in axial tension to prevent any compression of the wall $ac$ in an axial (i.e., with a component parallel with the element axis) direction, as the 45° portion is removed by pivoting its extremities to bring it into alinement with the wall portion $c$ to define a wall $d$ in the final fabric element $FE_2$. Any axial movement required in the lower portion of the fabric is handled with freedom from pleating (doubling on itself to give three layers) by slip ring 32. In the preferred embodiment, a total pressure of 25 p.s.i.g. is used, the closed cell polyurethane being chosen to compress in diameter under such pressure an amount corresponding in radius to the convolution width of the use intended for the diaphragm made up with the fabric element $FE_2$. The element $FE_2$ is set in its final configuration by the heat from the heater 24.

If desired, more than one fabric element FE may be given compression between dies 20 and 26. In this case, each fabric element is in effect, for the fabric element next to it, a part of the die operating on its surface of the latter. Thus, with three fabric elements between the dies 20 and 26, the outer two fabric elements are respectively part of the inner and outer dies as regards the middle fabric element. The expression "die" is used herein with reference only to elements and portions contributing to the effect on the fabric elements. Thus, if an outer metal compression member with frustoconical hole is used, and the diameter of the fabric element decreased by moving the metal member axially of the fabric element to change its effective diameters thereagainst, only the portions acting on the fabric at any given time are functional die portions and dies within the present meaning thereof. Thus, axially moving the frustoconical hole is to, effectively and within the meaning hereof, decrease the diameter of the outer die.

In preferred embodiments, dies are characterized by frictional surfaces, to discourage circumferential movement of the contacting fabric elements during circumferential compression thereof. By frictional surfaces herein is meant surfaces with coefficients of friction in excess of conventional machined parts. The most preferred die embodiments have rubbery surfaces; i.e., surfaces such as are characteristic of soft natural or synthetic rubbers or foam. Other frictional surfaces include those of cloth or fabric, and when fabric elements form in effect a portion of a die, their surfaces are frictional within the meaning of that expression herein.

In the preferred embodiment, the length of the portion $a$ (along the surface, perpendicular to a circumference thereof) is equal to half the circumference of the convolution desired in the use to which it will be put. The lowest periphery of the portion $a$ thus becomes the periphery of maximum strain in the final product, and in the preferred embodiment it has an added circumferential compression corresponding in amount to the total required of it in use imposed in the supplemental circumferential compression steps carried out between dies 20 and 26. The upper extremity of the line rotated to define the portion $a$ is a distance from the axis corresponding to the final distance desired in the fabric wall at the intersection thereof with the head $b$. The lower extremity of the line rotated to define $a$ is further from the axis by a distance slightly more than the width of the convolution in the use for which the particular embodiment is designed. The lower extremity is in the final reduction of wall diameter brought closer to the axis a distance at least equal to the convolution width, while the angle between $a$ and $c$ is removed.

Furthermore, in preferred embodiments the circumferentially variable dies 20 and 26 are formed of materials as above specified which prevent circumferential slipping relative thereto of the fabric elements therebetween, whereby the supplemental circumferential compression takes place uniformly around the entire periphery of each of the peripheries of the rolling wall $d$, guaranteeing that at no angular zone is there insufficient limited extensibility to permit convolution formation without circumferential wall movement. The original circumferential extensibility, owing to the drawing steps (between dies 12 and 16) and bias and other thread relationship effects, operates thus wholly as a safety factor.

Figure 6:
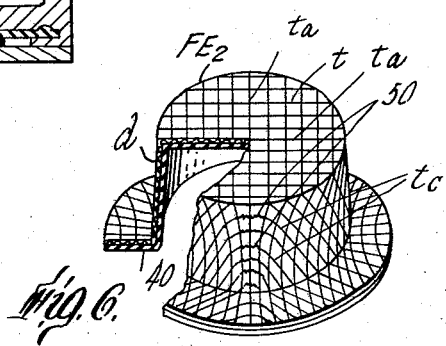
FIG. 6 is a very diagrammatic view of an element and diaphragm manufactured according to the above method.

The diaphragm, shown diagrammatically in FIG. 6, is completed by assembling a fluid-tight layer of elastomer thereto. Methods of doing this are disclosed in my above-mentioned patent. Preferably the elastomer is applied in such a way that while liquid it flows axially along the rolling wall $d$ of the fabric element $FE_2$ in a direction away from the head $b$, so as to insure that axial extensibility, eliminated in the drawing steps and kept out in the supplemental compression, is not permitted to creep back in application of the elastomer. The elastomer may be rubber, synthetic rubber, or a silastic, for example, depending on the requirements of the end use desired. The layer of elastomer 40 is on the inside in the embodiment shown, but it may be on the outside if preferred; in either case the elastomer preferably permeates the interstices of the fabric element $FE_2$ as well.

The threads $t$ in the fabric element or fabric portion of the finished diaphragm are, as noted, very diagrammatically shown in FIG. 6, distances between threads being greatly exaggerated. In the arched crossing threads $t_c$, in the angular zones near where they cross the axial threads $t_a$, the supplemental circumferential compression steps produce a "herringbone" effect indicated at 50, particular threads zigzagging alternately toward and away from the head through compaction without however increasing the thickness of the fabric. It will be noted that in the head portion $b$ the threads $t$ are at right angles and free of circumferential compression.

Although in the preferred embodiment the fabric element is formed from a flat loomed or woven fabric, it may also suitably be formed from other flat fabric with fibers interlocking so that circumferential (or peripheral) stretching or extension of the rolling wall is not permitted substantially beyond the extent of the above described compression (and any bias or equivalent thread relationship permitted limited movement), to avoid ballooning in the unsupported convolution in use therein; for example, flat knitted fabrics may be used. Other embodiments of the invention will occur to those skilled in the art. The rolling wall may be defined by rotating various linear configurations about the diaphragm axis. If desired, the fabric element may be convoluted in the step of assembling to it the elastomer layer, and held in that configuration by the cooled elastomer.

I claim:

1. A rolling seal diaphragm with a fabric layer and a water-tight elastomer layer adherent thereto, said fabric layer including a head portion perpendicular to the diaphragm axis and a wall portion defined by rotating a line about said axis and intersecting said head, said fabric layer being defined by interlocking threads running without interruption from said wall portion into said head portion and from said head portion into said wall portion, the interlocking threads being movable relative to one another in at least some directions, said fabric layer being free of axial extensibility throughout said wall portion and being in circumferential compression in said wall portion, the degree of said circumferential compression being sufficient to produce a herringbone configuration in zones of relatively less circumferential fiber movement owing to the relationship of said interlocking threads along the maximum strain periphery of said wall portion, and said head being uninterrupted by a central hole across at least half the diameter thereof.

2. The diaphragm of claim 1 in which the said head portion is free from circumferential compression.

3. A rolling seal diaphragm with a fabric layer and a water-tight elastomer layer adherent thereto, said fabric layer including a head portion perpendicular to the diaphragm axis and a wall portion defined by rotating a line about said axis and intersecting said head, said fabric layer being defined by interlocking threads running without interruption from said wall portion into said head portion and from said head portion into said wall portion, the interlocking threads being movable relative to one another in at least some directions, said fabric layer being free of axial extensibility throughout said wall portion and being in circumferential compression in said wall portion, the degree of said circumferential compression being greater than 5% in every 10° portion around the maximum strain periphery owing to the relationship of said interlocking threads along the maximum strain periphery of said wall portion, and said head being uninterrupted by a central hole across at least half the diameter thereof.

4. The diaphragm of claim 3 in which the said head portion is free from circumferential compression.

References Cited in the file of this patent

UNITED STATES PATENTS

| | | |
|---|---|---|
| 2,849,029 | Taplin | Aug. 26, 1958 |
| 2,924,852 | Michalko | Feb. 16, 1960 |
| 3,032,824 | Proud | May 8, 1962 |
| 3,083,734 | Taplin | Apr. 2, 1963 |